(No Model.)

W. N. McCARTY.
COMBINATION TOOL.

No. 605,792. Patented June 14, 1898.

Witnesses
Lee J. Van Horn.
Victor J. Evans.

Inventor
William N. McCarty.
By John Wedderburn.
Attorney

THE NORRIS PETERS CO., PHOTO-LITHO., WASHINGTON, D. C.

UNITED STATES PATENT OFFICE

WILLIAM N. McCARTY, OF BLANKET, TEXAS.

COMBINATION-TOOL.

SPECIFICATION forming part of Letters Patent No. 605,792, dated June 14, 1898.

Application filed September 8, 1897. Serial No. 650,947. (No model.)

*To all whom it may concern:*

Be it known that I, WILLIAM N. MCCARTY, a citizen of the United States, residing at Blanket, in the county of Brown and State of Texas, have invented certain new and useful Improvements in a Combination-Tool; and I do hereby declare the following to be a full, clear, and exact description of the invention, such as will enable others skilled in the art to which it appertains to make and use the same.

My invention relates to combination-tools, the object of the same being to provide in a single implement a plurality of coacting devices which may be used advantageously in connection with the erection of wire fences and the tightening of the line-wires in case they should become slack.

The invention resides particularly in the formation upon a tool comprising two pivoted levers and jaws at the end thereof of angularly-arranged wire-twisting fingers and a pivoted link on the rear end of one of said levers having a loop or eye in its opposite end, through which the other lever is adapted to be passed for the purpose of holding said twisting-fingers in their separated positions.

The invention also consists in other details of construction and combinations of parts, which will be hereinafter more fully described and claimed.

Figure 1:
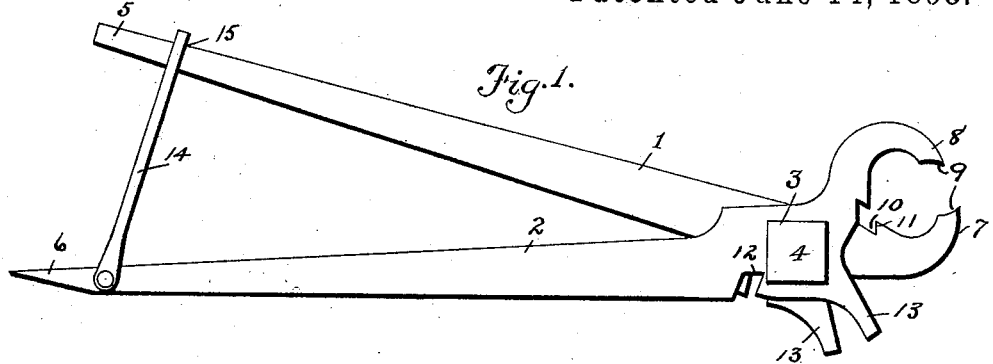
Figure 2:
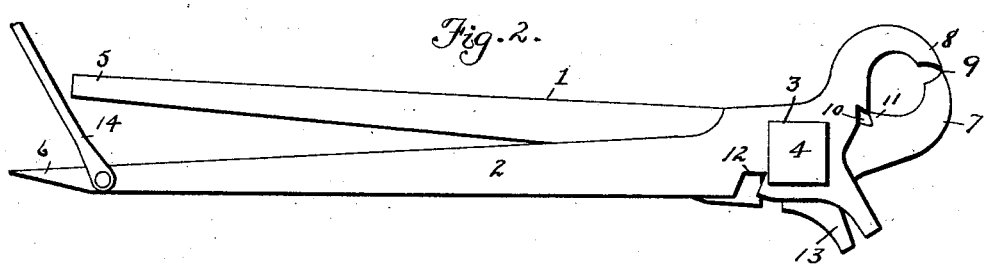
Figure 3:
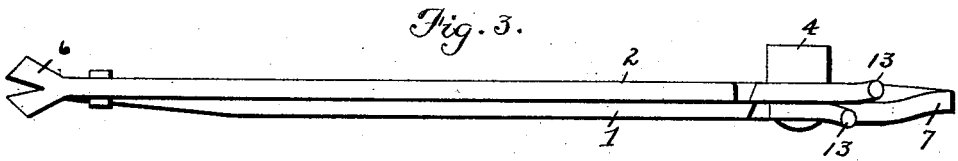
Figure 4:
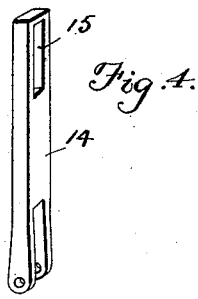

In the drawings forming a part of this specification, Figure 1 represents a side elevation of my improved tool with the pivoted levers in their open positions. Fig. 2 is a similar view with the parts in their closed positions. Fig. 3 is an edge view of the same, and Fig. 4 is a detail perspective view of the stop-link on the ends of the pivoted levers.

Like reference-numerals indicate like parts in the different views.

My improved tool is made up of a pair of levers 1 and 2, respectively, pivoted together at 3, the pivot through which they are connected having a solid head 4 upon one side thereof, by means of which staples or nails may be driven into the fence-post or other device. The rear end of the lever 1 is formed into a screw-driver 5, and the corresponding end of the lever 2 is formed into a nail-puller 6. The opposite ends of the levers 1 and 2 are formed with jaws 7 8, having curved outer edges and sharpened ends 9, serving as a means for extracting staples or for loosening them for the purpose of passing the line-wires of the fence therethrough. The inner edges of the jaws 7 and 8 are concaved, and the rear ends thereof are formed with notches 10 10, forming teeth or projections 11, which serve to enable the meeting ends of two strands of wire to be twisted for the purpose of splicing them together. The side edges of the levers 1 and 2, adjacent to the pivot 3, are cut away or slotted, as shown at 12, the opposite edges of the slots being sharpened and constituting the wire-cutters for severing the line-wires at any desired point. Extending outwardly from the sides of the levers 1 and 2 at points between the slots 12 and the jaws 7 and 8 are wire-twisting fingers 13 13, which are formed with rounded outer surfaces, so that when the wire is twisted there will be no danger of cutting or straining it by abrading its outer surface. The said fingers 13 may be separated one from the other by separating the levers 1 and 2 and may be closed by the reverse operation. They are held in open position by means of a stop-link 14, which is formed with a yoked end which straddles the rear end of the lever 2 and is pivoted thereto and has a slot 15 in its opposite end, into which the rear end of the lever 1 is adapted to fit. By this construction the handle portion of the levers 1 and 2 may be gripped tightly without closing the jaws and the fingers 13. When the fingers 13 13 are in their open position, the wire may be readily twisted into a perfect figure 8, and by releasing the stop-link 14 said fingers may be brought into close relation one to the other for the purpose of removing them from the loops formed in the wire. When the rear end of the lever 1 extends through the slot or opening 15 in the locking-link 14, both the outward and inward movement of the levers 1 and 2 is effectually prevented. This is an important feature of my invention and one upon which I claim a marked advantage over anything of a similar nature which has come to my notice.

Having now described my invention, what I claim as new, and desire to secure by Letters Patent, is—

1. A tool comprising a pair of pivoted levers and a stop-link pivoted to one of said levers and provided with a slot or opening in its free end, through which passes the other of said levers, the outer end of the said stop-link being free to move upon the arc of a circle, with the pivotal point of said link as a center, whereby the end of the lever which passes through the slot therein may be positively adjusted at any point relative to the other of said levers.

2. A wire-twisting tool comprising a pair of levers pivoted one to the other and having laterally-extending overlapping twisting-fingers thereon, the said twisting-fingers being formed integral respectively with said levers and lying in the same plane therewith, and means for adjusting the relative positions of said twisting-fingers.

3. A tool of the character described, comprising a pair of pivoted levers having jaws formed upon their forward ends, having twisting-fingers located adjacent to the said jaws and adapted to coact one with the other, the said fingers extending laterally of said levers, formed integral therewith and lying in the same plane therewith, and a locking-link pivoted at one end to one of said levers and having a slot or opening in its opposite end, through which the other of said levers is adapted to pass, the free end of said link being capable of movement upon the arc of a circle, with its pivotal point as a center, whereby said levers and the twisting-fingers attached thereto may be positively adjusted relatively, one to the other.

In testimony whereof I have signed this specification in the presence of two subscribing witnesses.

WILLIAM N. McCARTY.

Witnesses:
C. W. TUCKER,
ADAM S. MARLIN.